United States Patent Office 3,109,962
Patented Nov. 5, 1963

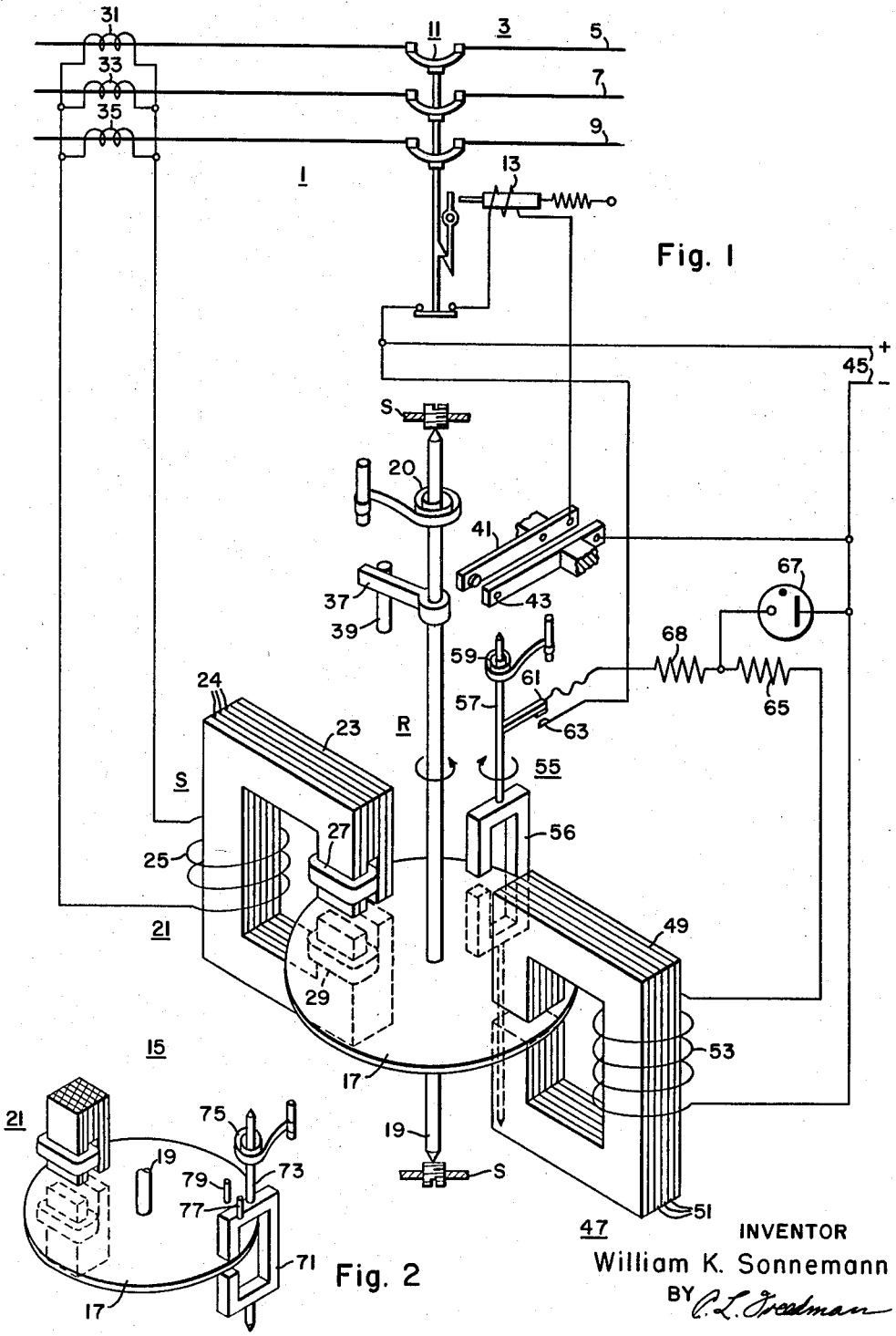

3,109,962
TIME-DELAY DEVICES
William K. Sonnemann, Roselle Park, N.J., assignor to Westinghouse Electric Corporation, East Pittsburgh, Pa., a corporation of Pennsylvania
Filed July 26, 1960, Ser. No. 45,358
9 Claims. (Cl. 317—36)

This invention relates to time-delay devices and has particular relation to time-delay relays of the induction type.

The present invention is particularly applicable to an induction relay of the type having an electroconductive armature movable under the influence of an electromagnetic driving system. Suitable damping means are provided for damping movement of the armature when the driving system is energized to a predetermined level effective to move the armature.

In the present invention damping means are provided to influence the armature. However, the magnitude of the damping is dependent on the direction of movement of the armature. In a preferred embodiment of the invention, damping is reduced in response to a resetting movement of the armature and increased in response to opposite movement of the armature.

It is, therefore, an object of the invention to provide a time-delay device of improved construction.

It is another object of the invention to provide an induction time-delay relay having a driving system acting upon an electroconductive armature with damping means having a damping effect dependent on the direction of armature movement.

It is still another object of the invention to provide a relay as defined in the preceding paragraph wherein the damping means comprises magnetic flux producing means positioned to influence the armature and mounted for movement relative to the driving system in response to movement of the armature to provide a small damping effect when the armature is moving toward its reset position.

Other objects of the invention will become apparent from the following description taken in conjunction with the accompanying drawing in which:

FIGURE 1 is a schematic representation of an electrical system including an induction relay shown in perspective and constructed in accordance with the present invention; and FIG. 2 is a view in perspective with parts broken away of a modified form of the invention.

Referring to the drawing, there is illustrated in FIG. 1 an electrical system represented generally by the numeral 1 including an electrical circuit 3. The circuit 3 is illustrated as including three conductors 5, 7 and 9 and may be either a three-phase, alternating-current circuit or a single-phase, three-wire, alternating-current circuit. It will be assumed that the circuit 3 is operating at a frequency of 60 cycles per second.

In order to permit interruption and establishment of the circuit 3, there is provided a suitable circuit breaker 11 illustrated as having a trip coil 13 which is effective when energized to operate the breaker 11 for interrupting the circuit 3. The trip coil 13 is to be energized in response to the flow of excessive current in the circuit 3 to operate the breaker 11 for protecting the circuit 3 from damage due to such excessive current.

In order to control energization of the trip coil 13, the present invention provides an overcurrent relay device represented generally by the numeral 15 which preferably possesses time-delay characteristics. The relay 15 is illustrated as being of the induction type and includes a rotor structure R and a stator structure S. The rotor structure has an electroconductive armature 17 preferably in the form of a disc which is mounted for rotation by a shaft 19. A spiral spring 20 has an inner end connected to the shaft 19 and an outer end connected to a portion of the stator structure of the relay to bias the shaft 19 and the disc 17 in a clockwise direction as viewed from the upper end of the shaft 19.

In order to effect movement of the disc 17, there is provided a suitable electromagnetic driving system 21 illustrated as including a substantially C-shaped magnetic structure 23, preferably formed of a plurality of laminations 24 of any suitable soft magnetic material. The structure 23 includes an air gap in which a portion of the disc 17 is positioned. A suitable winding 25 surrounds a portion of the structure 23 to establish when energized a magnetomotive force which directs magnetic flux through the structure 23, the associated air gap and the portion of the disc 17 in the air gap.

In order to establish a shifting magnetic field in the air gap for effecting rotation of the disc 17 in response to energization of the winding 25, a pair of electroconductive shading coils 27 and 29 are positioned to link portions of the magnetic flux traversing the structure 23. The winding 25 is connected for energization from the conductors 5, 7 and 9 by means of current transformers 31, 33 and 35 associated respectively with the conductors 5, 7 and 9. When the winding 25 is energized, a shifting magnetic field is established which effects rotation of the disc 17 in a counterclockwise direction as viewed from the upper end of the shaft 19.

In order to effect a controlling function, the shaft 19 has secured thereto an operating arm 37 which bears against a suitable adjustable stop 39 under the influence of the spring 20 when the driving system 21 is deenergized. A pair of fixed contacts 41 and 43 are mounted in any suitable manner in spaced relation with each other and with the operating arm 37. The contacts 41 and 43 are mounted in the path of movement of the arm 37 such that the contact 43 may be moved into engagement with the contact 41 when the arm 37 is rotated sufficiently to engage the contact 43 or its support. The contact 43 is preferably mounted on a suitable spring support so as to be deflectable towards and away from the contact 41.

The contacts 41 and 43 are connected in series relation in a circuit which includes the trip coil 13 and a suitable source of direct voltage which is represented by the conductors 45. When the contacts 41 and 43 are in engagement produced by predetermined rotation of the arm 37 in response to an overcurrent condition of the circuit 3 the above-mentioned tripping circuit is established which results in energization of the trip coil 13 and operation of the breaker 11 to interrupt the circuit 3.

For various reasons, it is desirable that a substantial delay be provided between the time of energization of the winding 25 by a quantity representing an excessive current in the circuit 3 and the time when the contacts 41 and 43 are moved into engagement. In the present invention, such a time delay is established by the provision of suitable eddy-current damping means 47 including a substantially C-shaped magnetic structure 49 having an air gap in which a portion of the disc 17 is positioned. The structure 49 may be constructed of any suitable non-permanent magnetic material and, if desired, may be formed of a plurality of laminations 51.

A suitable winding 53 may surround a portion of the structure 49 to be connected for energization from the source of direct voltage 45. When the winding 53 is energized, a magnetomotive force is established which directs magnetic flux through the structure 49 and the disc 17. As is understood in the art, motion of the disc 17 through such magnetic flux results in the establishment of a torque which tends to retard movement of the disc 17. This retarding action results in the establishment of the desired time delay.

In order to control operation of the damping means 47, the present invention provides a suitable device for detecting rotation of the disc 17. This may take the form of a well-known motion detector which has a light frictional engagement with the disc 17. In FIG. 1 the motion detector takes the form of control means 55 effective to cause energization of the winding 53 and, therefore, the establishment of a damping effect in response to movement of the disc 17 under the influence of the driving system 21. In many applications, it is desirable that the disc be returned to its reset position very quickly when the energization of the driving system is reduced to a value which is ineffective to rotate the disc toward its controlling or tripping position. In FIG. 1 the control means 55 is effective to cause deenergization of the damping means 47 in response to movement of the disc 17 toward its reset position resulting when the energization of the driving system 21 falls below the value required to maintain movement of the disc toward its tripping position.

In the embodiment of FIG. 1, the control means 55 comprises magnetic flux producing means position to influence the disc 17, and is preferably in the form of a permanent magnet 56 of substantially C-shaped configuration which may be formed of any suitable permanent magnetic material. The magnet 56 includes an air gap in which a portion of the disc 17 is positioned. In order to control energization of the damping means 47, the magnet 56 is mounted for rotation with respect to the driving system 21 by means of a shaft 57. Inasmuch as magnetic flux produced by the magnet 56 passes through the disc 17, movement of the disc 17 will also result in movement of the magnet 56 about the axis of the shaft 57. For example, when the disc 17 is rotated in a counterclockwise direction as viewed from the upper end of the shaft 19, the magnet 56 will be rotated in a clockwise direction, as viewed from the upper end of the shaft 57. Conversely, clockwise rotation of the disc 17 will result in counterclockwise movement of the magnet 56 about its axis. A suitable spiral spring 59 has an inner end connected to the shaft 57 and an outer end connected to a part of the stator structure of the relay to bias the magnet 56 in a counterclockwise direction, as viewed from the upper end of the shaft 57.

In order to permit control of energization of the winding 53 of the damping means 47, a suitable contact 61 is secured to the shaft 57 for movement therewith. A fixed contact 63 is spaced from the contact 61 in the path of movement of the contact 61 when the winding 25 of the driving system 21 is deenergized. The contacts 61 and 63 are connected in series relation in a circuit which includes the source 45 and the winding 53.

In operation, when the winding 25 is energized sufficiently to effect rotation of the disc 17 in a counterclockwise direction, as viewed from the upper end of the shaft 19, the magnet 56 will move about the axis of the shaft 57 in a clockwise direction, as viewed from the upper end of the shaft 57. Such movement of the magnet 56 results in movement of the contact 61 into engagement with the contact 63 a very short time after initiation of movement of the disc 17. When this occurs, the source 45 is connected to the winding 53 to establish the previously described damping action.

This condition is maintained until energization of the winding 25 falls below the energization required to maintain movement of the disc 17 in a counterclockwise direction. When energization of the winding 25 is so reduced, the disc 17 will stop and begin to rotate in a clockwise direction, as viewed from the upper end of shaft 19 toward its reset position under the influence of the spring 20. When such clockwise movement begins, the magnet 56 begins to move in a counterclockwise direction about the axis of the shaft 57, as viewed from the upper end of this shaft, under the combined action of movement of the disc 17 and the bias spring 59. When this occurs, the contact 61 is moved out of engagement with the contact 63, thereby resulting in the disconnection of the winding 53 from the source 45. This removes the major damping action supplied by the means 47 from the disc with the result that the disc 17 quickly rotates to its reset position under the influence of the spring 20.

It is observed that the damping means 47 remains energized until the disc 17 begins to move toward its reset position. Thus the damping means is effective to damp any kinetic energy in the disc 17 and associated rotor parts following reduction in energy of the winding 25.

Inasmuch as the magnet 56 produces flux which passes through the disc 17, it will also establish a small damping action which tends to damp rotation of the disc 17 toward its reset position. This damping action is considerably less than that produced by the damping means 47. However, this small damping action by the magnet 56 is desirable in that it minimizes undesirable bouncing of the arm 37 against its associated stop 39.

In order to minimize the effect of variations in voltage of the source 45, the structure 49 of the damping means 47 may be proportioned to become magnetically saturated in response to an energization of the winding 53 which is somewhat less than the energization of the winding produced when the source 45 has a normal magnitude. With this arrangement, the damping effect of the damping means 47 is substantially unchanged, even though the magnitude of the source 45 is reduced to a certain extent. Variations of the magnitude of the source 45 may also be minimized by connecting a constant-voltage device such as a Zener diode or a voltage regulating tube 67 across the source 45 through a resistor 68.

The voltage-regulator circuit also includes a resistor 65. This resistor facilitates a quick build-up of magnetic flux in the structure 49 when the winding 53 is energized, to provide a short time constant of the energizing circuit.

The embodiment of FIG. 2 is similar to that of FIG. 1 except that the damping means 47 and its energizing circuit together with the magnet 56 are replaced by a C-shaped permanent magnet 71 which is mounted for rotation about the axis of a shaft 73 relative to the stator of the relay. A weak spring biases the magnet 71 in a counterclockwise direction as viewed from the upper end of the magnet in FIG. 2 against a stop 77. In this position the air gap of the permanent magnet 71 partially receives the edge of the disc 17 and exerts a weak damping torque thereon.

When the driving system is strongly energized the disc 17 rotates in a counterclockwise direction as viewed from the upper end of the shaft 19 in FIG. 2 against the weak damping torque developed by the permanent magnet 71. As the disc rotates, it rotates the magnet 71 in a clockwise direction as viewed from the upper end of the magnet in FIG. 2 to carry the magnet against a stop 79. In this position the magnet exerts a strong damping torque on the disc for the remainder of the disc rotation.

Should the energization of the driving system now be terminated, the shaft 19 would be rotated by its associated spring 20 (not shown in FIG. 2) in a resetting direction. This would rotate the permanent magnet 71 promptly to its weak-torque position, and the resetting of the relay thereafter would be completed rapidly.

Referring again to FIG. 1 it should be noted that the damping torque may be controlled in various ways. For example, let it be assumed that the spring 59 is selected to bias the magnet in a counterclockwise direction as viewed from the upper end of the shaft 57 with a torque just sufficient to separate the contacts 61 and 63 when the disc 17 is stationary. When the disc 17 is rotated in a counterclockwise direction by the electromagnet 23 the eddy-current-produced torque applied to the magnet 56 by the disc is sufficient to overcome the bias of the spring 59. This results in engagement of the contacts 61 and 63 and the connection of the damping means 47 in effective damping condition in the manner previously discussed.

When counterclockwise rotation of the disc 17 ceases, the bias of the spring 59 now is sufficient to separate the contacts 61 and 63 before any reverse or resetting motion of the disc 17 takes place. Such early contact separation renders the damping means 47 ineffective during the complete resetting rotation of the disc 17.

Although the invention has been described with reference to certain specific embodiments thereof, numerous modifications are possible, and it is desired to cover all modifications falling within the spirit and scope of the invention.

I claim as my invention:

1. In an induction device, electroresponsive driving means, electroconductive armature means mounted for movement relative to said driving means under the influence of the driving means, said armature means being movable between spaced reset and control positions, biasing means for biasing the armature means towards the reset position, said driving means being effective when energized in accordance with an electrical quantity in excess of a preselected amount to move said armature means away from said reset position towards said control position, and a direction-sensitive device responsive to the direction of movement of the armature means for operation from a first condition for one direction of such movement to a second condition for a second direction of such movement, said direction-sensitive device including damping means responsive to the condition of said direction-sensitive device for damping movement of said armature means to an extent dependent on the direction of movement of the armature means, said direction-sensitive device comprising a permanent magnet having an air-gap within which part of the armature means is located, said permanent magnet being mounted for movement relative to the driving means in response to movement of the armature means from a first position corresponding to said first condition to a second position corresponding to said second condition to control the extent of said damping.

2. In an induction device, electroresponsive driving means, electroconductive armature means mounted for movement relative to said driving means under the influence of the driving means, said armature means being movable between spaced reset and control positions, biasing means for biasing the armature means towards the reset position, said driving means being effective when energized in accordance with an electrical quantity in excess of a preselected amount to move said armature means away from said reset position towards said control position, electroresponsive damping means effective when energized for damping movement of said armature means towards said control position, and direction-sensitive control means for controlling energization of said damping means, said control means including auxiliary damping means influencing said armature means and a control unit responsive to movement of said auxiliary damping means by the armature means, said auxiliary damping means being mounted for movement in response to movement of said armature means for operating the control unit to effect deenergization of said damping means when the armature means moves away from said control position towards said reset position.

3. In an induction device, electroresponsive driving means, electroconductive armature means mounted for movement relative to said driving means under the influence of the driving means, said armature means being movable between spaced reset and control positions, biasing means for biasing the armature means towards the reset position, said driving means being effective when energized in accordance with an electrical quantity in excess of a preselected amount to move said armature means away from said reset position towards said control position, a permanent magnet having an air-gap within which part of the armature means is located to provide eddy-current damping for the armature means, and means mounting the permanent magnet for movement relative to the driving means in response to the damping force produced thereby from a first position providing a first damping effort to a second position providing a second damping effort of different magnitude.

4. In an induction device, electroresponsive driving means, electroconductive armature means mounted for movement relative to said driving means under the influence of the driving means, said armature means being movable between spaced reset and control positions, biasing means for biasing the armature means towards said reset position, said driving means being effective when energized in accordance with an electrical quantity in excess of a preselected amount to move said armature means away from said reset position towards said control position, electroresponsive damping means effective when energized from a direct voltage source for damping movement of said armature means towards said control position, permanent magnet means damping said armature means, said permanent magnet means being mounted for movement relative to said driving means in response to movement of said armature means, a source of direct voltage connected to energize said electroresponsive damping means, and contact means operated by movement of said permanent magnet means to control connection of said source to said damping means in accordance with the direction of movement of the armature means.

5. In an induction device, electroresponsive driving means, electroconductive armature means mounted for movement relative to said driving means under the influence of the driving means, said armature means being movable between spaced reset and control positions, biasing means for biasing the armature means towards said reset position, said driving means being effective when energized in accordance with an electrical quantity in excess of a preselected amount to move said armature means away from said reset position towards said control position, electroresponsive damping means effective when energized for damping movement of said armature means towards said control position, and permanent magnet means coupled to said armature means, said permanent magnet means being mounted for movement relative to said driving means in response to movement of said armature means for controlling energization of said damping means, said damping means including a non-permanent magnetic circuit linking said armature means, and winding means surrounding a portion of the magnetic circuit; a source of direct voltage connected to energize said winding means, and contact means operated by movement of said permanent magnet means to control connection of said source to said winding means, said damping means being arranged such that said magnetic circuit is magnetically saturated for an energization of said winding means which is less than the normal energization supplied by said source.

6. In an induction device, electroresponsive driving means, electroconductive armature means mounted for movement relative to said driving means under the influence of the driving means, said armature means being movable between spaced reset and control positions, biasing means for biasing the armature means toward said reset position, said driving means being effective when energized in accordance with an electrical quantity in excess of a preselected amount to move said armature means away from said reset position towards said control position, electroresponsive damping means effective when energized for damping movement of said armature means towards said control position, and permanent magnet means coupled to said armature means, said permanent magnet means being mounted for movement relative to said driving means in response to movement of said armature means for controlling energization of said damping means, said damping means including a non-permanent magnetic circuit linking said armature means, and winding means surrounding a portion of the magnetic circuit; a source of direct voltage connected to energize said winding means, contact means operated by movement of said permanent magnet means to control connection of said source to said winding means, and a resistance element connected in series relation with said source and said winding means.

7. In an electrical system, circuit means to be protected against overcurrent conditions, a circuit breaker including a tripping coil effective when energized to operate said breaker for interrupting said circuit means, and an induction device for controlling energization of said tripping coil, said device including electromagnetic driving means connected for energization from said circuit means, electroconductive armature means mounted for movement relative to said driving means under the influence of said driving means, said armature means being movable between spaced reset and tripping positions, biasing means for biasing the armature means towards said reset position, said driving means being effective when energized in accordance with an electrical quantity in excess of a preselected amount to move said armature means away from said reset position towards said tripping position, electromagnetic damping means effective when energized for damping movement of said armature means towards said tripping position, and direction-sensitive control means coupled to the armature means for controlling energization of said damping means, said control means being mounted for movement with respect to said damping means to effect energization of said damping means in response to movement of said armature means away from said reset position toward the tripping position, and to effect deenergization of said damping means in response to movement of said armature means towards said reset position.

8. In an electrical system, circuit means to be protected against overcurrent conditions, a circuit breaker including a tripping coil effective when energized to operate said breaker for interrupting said circuit means, and an induction device for controlling energization of said tripping coil, said device including electromagnetic driving means connected for energization from said circuit means, electroconductive armature means mounted for movement relative to said driving means under the influence of said driving means, said armature means being movable between spaced reset and tripping positions, biasing means for biasing the armature means towards said reset position, said driving means being effective when energized in accordance with an electrical quantity in excess of a preselected amount to move said armature means away from said reset position towards said tripping position, electromagnetic damping means effective when energized for damping movement of said armature means towards said tripping position, and direction-sensitive control means coupled to the armature means for controlling energization of said damping means, said control means being arranged to effect energization of said damping means in response to movement of said armature means away from said reset position towards the tripping position, and to effect deenergization of said damping means in response to movement of said armature means towards said reset position, said control means including permanent magnet damping means coupled to said armature means, said permanent magnet means being mounted for movement relative to said driving means.

9. In an induction device, electroresponsive driving means for producing a shifting magnetic field, electroconductive armature means mounted in said field for movement relative to said driving means under the influence of the driving means, said armature means being being movable between spaced reset and control positions, biasing means for biasing the armature means towards the reset position, said driving means being effective when energized in accordance with an electrical quantity in excess of a preselected amount to move said armature means away from said reset position towards said control position, eddy-current damping means responsive to the direction of movement of the armature means for damping movement of the armature means in a first direction of movement of the armature means, and means responsive to substantial reduction of motion of the armature means in the first direction for reducing the damping effectiveness of the eddy-current damping means.

References Cited in the file of this patent
UNITED STATES PATENTS 2,797,369    Cordray              June 25, 1957
3,036,243    Glassburn           May 22, 1962